United States Patent [19]

Vander Heyden

[11] Patent Number: 4,663,977
[45] Date of Patent: May 12, 1987

[54] SONIC MEASUREMENT OF GAS FLOW

[75] Inventor: William H. Vander Heyden, Mequon, Wis.

[73] Assignee: Badger Meter, Inc., Milwaukee, Wis.

[21] Appl. No.: 815,865

[22] Filed: Jan. 3, 1986

[51] Int. Cl.$^4$ .............................................. G01F 1/66
[52] U.S. Cl. ..................................... 73/861.27; 73/24; 73/861.03; 364/510
[58] Field of Search ...................... 73/24, 597, 861.02, 73/861.03, 861.27, 861.28; 364/510

[56] References Cited

U.S. PATENT DOCUMENTS

| | | |
|---|---|---|
| 3,835,704 | 9/1974 | Elazar et al. |
| 3,935,735 | 2/1976 | Lee . |
| 4,052,896 | 10/1977 | Lee et al. . |
| 4,390,956 | 6/1986 | Cornforth et al. ............ 73/861.03 X |
| 4,527,600 | 7/1985 | Fisher et al. ..................... 364/510 X |
| 4,584,435 | 4/1986 | Jacobsen et al. ............. 73/861.03 X |

OTHER PUBLICATIONS

Badger Meter, Inc., Dwg. SD-151635, Feb. 27, 1980 (2 sheets).
U.S. application Ser. No. 716,471 of William H. Vander Heyden filed Mar. 27, 1985, and assigned to Badger Meter, Inc.

Primary Examiner—Herbert Goldstein
Attorney, Agent, or Firm—Quarles & Brady

[57] ABSTRACT

A microcomputer is interfaced to a pair of probes for sending and receiving sonic signals across a flow stream of gas. The microcomputer reads phase information and determines a phase difference that corresponds to a difference in travel times for two oppositely directed sonic signals. The microcomputer is also interfaced to a load cell that communicates with the flow stream through two valve-controlled gas lines. The microcomputer controls the valves to trap a sample of the gas and to allow the gas to attain two different pressures. By measuring changes in pressure and weight for a fixed volume of the gas, the microcomputer can determine sonic velocity. It then uses this result and the phase difference determined from the sonic measurement to calculate flow rate and to generate an output signal proportional to the flow rate of the gas.

5 Claims, 8 Drawing Figures

SONIC MEASUREMENT OF GAS FLOW

BACKGROUND OF THE INVENTION

1. Field of the Invention

The invention relates to instruments for measuring fluid flow through a pipe of conduit, and more particularly to those meters for measuring the flow of gas.

2. Description of the Prior Art

The consumption of natural gas is typically determined by measuring a volume of gas that flows past a certain location in a transmission or distribution pipe during a predetermined time interval. As the cost of natural gas increases, there is a need for more accurate techniques and less expensive equipment for measuring gas flow. Gas flow in small pipes has been measured with orifice metering equipment. In large pipes, multiple orifice metering runs are required to obtain the 0.5% accuracy that is specified by gas companies.

For many years, ultrasonic meters have been used to measure liquid flow in pipes. While this type of meter has provided 0.5% accuracy or better for measuring the flow of liquids, its application to gas is limited to "clean" gases with relatively stable composition that flow in fully developed turbulent flow conditions. At many sites that require flow metering, the gases are dirty, change composition rapidly and do not flow under fully developed turbulent flow conditions. Ultrasonic flow meters have not been able to provide the desired accuracy under such conditions.

A basic technical problem in applying ultrasonics to the measurement of gas flow arises from the different physical properties of liquids and gases. Gas must be transported in large volume due to its lower density, therefore, gas flows are typically faster than liquid flows. On the other hand, the speed of a sonic signal as it travels through a gas is slower than when it travels through a liquid. Because the speed of a sonic signal through a liquid is so much greater than the flow rate of the liquid through a pipe, the physical effects of the flow stream in delaying the sonic signal do not prevent the meter from attaining the specified accuracy. In a gas, however, the speed of the sonic signal may be one or more orders of magnitude closer to the gas flow rate, and the physical effects of the gas flow in delaying the sonic signal will significantly affect the accuracy of the measurement.

A basic ultrasonic flow meter for liquids is shown and described in Lee, U.S. Pat. No. 3,935,735, issued Feb. 6, 1976, and assigned to the assignee of the present invention. This meter uses a pair of transducers mounted on opposite sides of a diametrical section of a pipe, with one of the transducers being positioned downstream from the other. This sets up a diagonal ultrasound path from one transducer to the other. Each transducer is both a transmitter and a receiver of an ultrasonic pulse train. In transmission, electrical signals are converted by the transducers to sound waves, while in reception, the transducers convert sound waves to electrical signals. Two pulse trains are transmitted at opposite ends of the ultrasound path and are received a short time later at their opposite destinations.

Each ultrasonic pulse train travels across the flow stream at approximately the speed of sound through the particular liquid medium. Depending upon the flow velocity of the medium in the longitudinal direction through the pipe, the travel time will be shortened slightly for travel in the downstream direction and travel time will be lengthened slightly for travel in the upstream direction. For pipes of small diameter, the total travel time for the ultrasonic wave is very short. The measurement of small changes in travel time of the ultrasonic wave is a basic technical problem in metering flow rate.

As explained in the Lee patent, a mathematical relationship has been developed in which the flow rate is expressed as a function of elapsed travel times for the two ultrasonic pulse trains, and further as a function of the difference between the travel times in the upstream and downstream direction, respectively. The flow rate (V') along the axis of a pipe is related to the flow rate (V) along an acoustic path L by the sine of an angle $\theta$, which is the angle of the diagonal acoustic path relative to the axis of the pipe. With $\theta$ as some preselected, known angle, the flow rate (V') in the axial direction can be expressed in terms of some constant (K), the difference between the two travel times $(T_{21} - T_{12})$ and the product of the two travel times $(T_{12}$ and $T_{21})$ as follows:

$$V' = \frac{K(T_{21} - T_{12})}{(T_{12})(T_{21})} \quad (1)$$

In a pipe with a diameter of one foot, and a medium in which the speed of the sonic wave is 5000 feet/second when the full-scale fluid flow is 2.5 feet/second, the difference between the two travel times is 0.2 microseconds ($0.2 \times 10^{-6}$ seconds). For an accuracy of 1% of full scale, a difference in travel times of 2 nanoseconds ($2 \times 10^{-9}$ seconds) must be detected.

The times of travel, $T_{12}$ and $T_{21}$ in equation (1), can be expressed in terms of the path of travel (L), the speed of sound in the gaseous medium (c) and the flow rate of the gas (V) along the path (L) as follows:

$$T_{12} = \frac{L}{c + V} \quad T_{21} = \frac{L}{c - V} \quad \text{(2 and 3)}$$

In the Lee patent, an assumption was made that $c >> V$ and $V'$. This meant that either $T_{12}$ or $T_{21}$ could be taken to be L/c and that either one of the two travel times, $T_{12}$ or $T_{21}$ could be squared to obtain the denominator of equation (1) above.

The same assumption cannot be made for measurement of gas flow. The magnitude of V is not negligible in comparison with the sonic velocity (c). Also, the flow of the gas generates strong components that cross the acoustic path. This causes the phenomenon of "long pathing" of the sonic signal as it travels across the gas flow, and also causes the generation of noise in the acoustic path.

In the long pathing condition, the sonic signal does not follow the path L, the shortest path between two transducers. Instead it deviates from the path L, due to the greater effect of the velocity of the flow stream. While it moves generally in the direction of the path L, it travels a greater distance, which might be conceived as an arcuate path between the two transducers.

Noise may be caused by local turbulent flows which cause a number of small deviations from the shortest path for L. This might be thought of as zig-zag path that crosses the path L numerous times. Again, the result is that the acoustic signal travels a longer distance than L.

Long pathing and noise each have the effect of extending travel times. In effect, an error would be present in the travel times $T_{12}$ and $T_{21}$ used in the calculation of equation (1) by presently available metering equipment, and this error has been an obstacle to applying ultrasonic flow meters to the high accuracy measurement of gas.

Any errors in $T_{12}$ are usually also included in $T_{21}$ so they are cancelled from the numerator of equation (1). In the denominator of equation (1) any errors are magnified by the multiplication.

The Lee patent further discloses that the difference in the two travel times (the numerator in equation (1) can be measured by detecting the difference in electrical phase ($\Phi_{21} - \Phi_{12}$) of two relatively lower frequency signals that can be extracted from higher frequency ultrasonic signals. Thus, equation (1) above can be rewritten as follows, where $K'$ is different constant than $K$ in equation (1):

$$V = \frac{K'(\phi_{21} - \phi_{12})}{(T_{12})(T_{21})} \quad (4)$$

The resolution of phase differences has recently been improved in a microcomputer-controlled flow meter disclosed in U.S. Pat. application Ser. No. 716,471, filed Mar. 27, 1985. However, a significant inaccuracy would still be encountered in attempting to measure the flow of gas, due to the enlargement of errors in the denominator for the reasons explained for equation (1).

A seemingly unrelated problem in measuring gas flows arises from the supercompressibility of gas at higher pressures. Boyle's law concerning ideal gases is expressed in the following well known equation of state:

$$PV = nRT \quad (5)$$

where:
P = pressure
V = volume
n = number of moles (units of molecular weight)
R = the universal gas constant
T = temperature In the physical world this equation is only a fair representation at moderate pressure and at temperatures near those at which gas condenses to a liquid. At the temperatures and pressures present in the typical gas transmission and distribution lines, equation (5) is replaced by the following equation defining a new factor Z, which is referred to as the compressibility factor:

$$Z = \frac{PV}{nRT} \quad (6)$$

For an ideal gas, $Z = 1$ and the deviation of Z from unity is a measure of the deviation of the actual relation from the ideal equation of state. More complicated equations of state have been developed to determine the compressibility factor Z based on pressure, volume or temperature readings and based on coefficients that account for the nonlinear behaviour of these variables in relation to one another. The coefficients for these equations are provided in reference tables, which can be used in conjunction with readings to calculate Z-factors. Z-factors have also been determined from graphs developed from empirical data for specific substances as a function of pressure, for example.

Now, a device referred to as a Z-meter has been developed to measure the compressibility of a gas. Until recently, gas meter readings were multiplied by Z-factors determined from the tables to estimate true readings. The introduction of the Z-meter has automated the determination of Z-factors.

The Z-meter uses a load cell which includes an enclosure of a known volume (V). Gas at operating temperature and pressure is diverted from a pipeline into the enclosure. A weighing device is attached to the enclosure to sense the weight W (mass x acceleration of gravity) of the known volume (V) of gas, and this permits a determination of the mass per volume, which is the volume density (p). Pressure and temperature sensors are also attached to the enclosure to sense the pressure and temperature of the sample of gas in the enclosure. The Z-meter also includes a device for sensing the molecular weight of one mole of the gas. Having sensed all these variables, the Z-meter can calculate the Z factor for the sample of gas in the load cell.

SUMMARY OF THE INVENTION

The invention is incorporated in one specific type of flow meter apparatus claimed herein, and is also practiced more generally in various other flow meters which utilize the general method of the invention.

The invention provides a method of measuring the rate of flow for a gaseous medium flowing through a pipe. The method merges the ultrasonic technique of flow measurement with a thermodynamic technique for determining sonic velocity.

The ultrasonic technique for flow measurement includes transmitting a first sonic signal across the flow of gaseous medium from a first probe to a second probe, transmitting a second sonic signal across the flow of gaseous medium from the second probe to the first probe, receiving the two signals and then determining a phase difference that is proportional to a time difference in the travel times for the two signals.

The measured flow velocity of a liquid is proportional to the travel time difference and inversely proportional to the product of the elapsed times or to the square of one of the elapsed travel times, however, this technique is not suitable for gas. This is because the measured flow rate has not been corrected for the effects of gas flow velocity and noise-producing phenomena on travel times.

By coupling a gas sampling device—which may include a load cell and a gas delivery device from a Z-meter—to a port in a pipe, by providing suitable valves to control intake and release of a sample of the gaseous medium, and by using a microelectronic processor to control the valves, to take readings and to perform calculations, the following steps can be performed: (1) measuring a difference in pressure of the sample, (2) measuring a difference in weight corresponding to the difference in pressure for a fixed volume of the gaseous medium to determine a difference in density, and (3) determining the sonic velocity of the signals traveling through the gaseous medium in response to the difference in pressure with respect to the difference in density.

In response to the phase difference and the sonic velocity, the microelectronic processor can determine the rate of flow in the axial direction for the gaseous medium flowing through the pipe and can then generate an output signal proportional thereto.

The invention also relates to flow meter apparatus that is used by connecting it to at least one port in a pipe and to a pair of ultrasonic probes, where the probes are each spaced around the circumference of a pipe and displaced along the pipe from the other.

The apparatus includes elements of an ultrasonic flow meter including (1) a signal generator for generating a first signal that is transmitted across the flow of gaseous medium from the first probe to the second probe, and a second signal that is transmitted across the flow of gaseous medium the second probe to the first probe, (2) a signal receiver for receiving the first and second signals through the second and first probes, respectively, (3) a circuit for digitizing portions of the first and second signals, and (4) a microelectronic processor for determining a flow rate for the gaseous medium. Without the other elements of the invention, however, the elements of the ultrasonic flow meter provide a flow rate that is not corrected for the effects of the flow and noise-producing phenomena on the travel times of the first and second signals.

Therefore, a gas sampling device is provided for connection to the port. The device has a chamber of fixed volume for receiving a sample of the gaseous medium. The device also has sensors for sensing pressure, temperature and weight of the sample of the gaseous medium. Valves are provided for establishing and interrupting fluid communication between the port and an inlet into the chamber and for opening and closing an outlet from the chamber. A microelectronic processor is coupled to the gas sampling device and is coupled for controlling the valves to execute a certain operational sequence.

In this sequence, fluid communication is first established between the port and the chamber, while holding the outlet closed. After a first time delay, pressure, temperature and weight of the sample are read. Fluid communication is then interrupted between the first port and the chamber and the outlet from the chamber is opened. After a second time delay, pressure, temperature and weight are read again.

The microelectronic processor is responsive to differences in pressure and weight for a fixed volume of the gaseous medium to determine sonic velocity of the first and second signals as a function of the difference in pressure with respect to the difference in density. Then, with the information normally provided by an ultrasonic flow meter and in response to the sonic velocity, it can determine a suitably accurate flow rate for the gaseous medium. The microprocessor can then generate output signals proportional to the flow rate and volume, for operating a visual display on the metering equipment.

One object of the invention is to apply ultrasonic techniques of flow measurement to natural gas and other gases while also providing a suitable degree of accuracy.

Another object of the invention is to be able to accommodate gas pipes as large as 12 inches in diameter with a single flow meter.

Another object of the invention is to provide a flow meter that is easy to install. The ultrasonic flow meter apparatus discussed herein can be used with probes that can be installed in existing pipelines. Only relatively small ports in the pipe must be provided.

These and other objects and advantages of the invention will become apparent from the following description and from the drawings, which form a part hereof and which are referred to in the description. These disclose a preferred embodiment which is but one example of the invention. For the range of devices contemplated by the invention, reference is made to the claims which follow the description.

DETAILED DESCRIPTION OF THE PREFERRED EMBODIMENT

Figure 1:
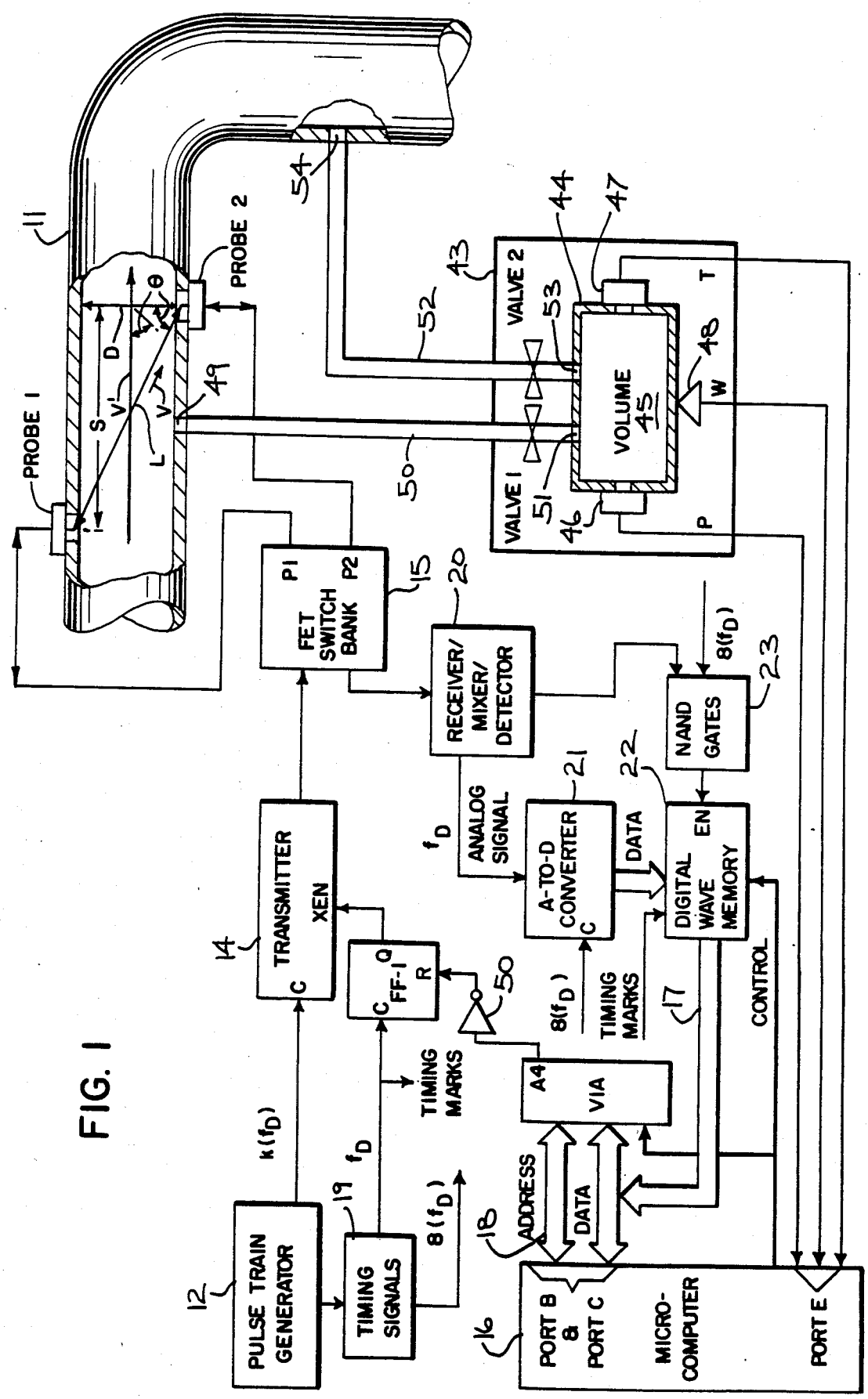
FIG. 1 is a block diagram of a flow meter apparatus that incorporates the present invention.

The invention is incorporated in a flow meter as illustrated in FIG. 1. The flow meter is connected to a pair of transducers, referred to as PROBE 1 and PROBE 2, positioned halfway around the pipe 11 from each other and on opposite sides of a diametrical section of the pipe 11. The probes penetrate the pipe wall and are spaced apart by the inner diameter D of the pipe 11. PROBE 1 is located upstream and PROBE 2 is located downstream by a distance S measured longitudinally along the pipe 11.

A gas, such as natural gas, is flowing through the pipe 11 with a velocity V' along the longitudinal axis of the pipe 11. Each of the transducers is both a transmitter and a receiver of ultrasonic waves that travel between PROBE 1 and PROBE 2 at a velocity V along a diagonal path of length L. The angle between diameter D and the path L has been designated $\theta$, and a sonic pulse train traveling from PROBE 1 to PROBE 2 travels at the speed of sound in the gaseous medium, that speed being designated c, plus the component of axial flow velocity taken along the signal path (c+V' sin $\theta$). A sonic wave traveling in the opposite direction, from PROBE 2 to PROBE 1, travels at (c−V' sin $\theta$). The time of travel can then be expressed as the length of the path L divided by the speed of travel in each respective direction to provide the following two equations:

$$T_{12} = \frac{L}{c + V' \sin \theta} \quad T_{21} = \frac{L}{c - V' \sin \theta} \quad \text{(1 and 2)}$$

The travel times $T_{12}$ and $T_{21}$ have been developed with reference to travel through the medium. If the travel times are expanded to include the time from transmission of an electrical signal to one of the probes to the time of reception of an electrical signal from one of the probes by a signal receiver, certain external delay factors are algebraically summed with equations (1) and (2) to arrive at the total travel time. These external delay factors include delays caused by cabling and delays caused by the circuitry used to transmit and receive the ultrasonic signals.

As explained in Lee, U.S. Pat. No. 3,935,735, issued Feb. 3, 1976, the average flow velocity in the axial direction, V', can be expressed in terms of these travel times, and independent of the velocity c, in the following manner:

$$V' = K \frac{(T_{21} - T_{12})}{(T_{12})(T_{21})} \quad (3)$$

where K is a constant.

In this equation the external delay factors have cancelled in the numerator on the assumption that they are of equal magnitude in either direction of travel. These delay factors would still be present in the denominator, but they will not be considered here, as these delay factors are not the delay factors related to the present invention.

The difference in travel time is further related to a phase shift in the ultrasonic waveform. The mathematical expression for an ideal voltage transmission signal V(t) coupled to one of the probes is as follows:

$$V(t) = V_o[G(t)] \sin \omega t \quad (4)$$

where $V_o$ is a constant and a scale factor for the voltage, and where G(t) is a gate function that defines the length of the transmission from the time the transmitter is turned on until it is turned off. The term "$\omega t$" in the sine function represents an angular wave velocity $\omega$, which is multiplied by a time "t" to arrive at an angle $\Phi$ for which the sine function can be evaluated. If $T_o$ is designated as the travel time (in the direction from PROBE 1 to PROBE 2) at zero flow, and $T_{12}$ is designated as the travel time at some non-zero flow, then the voltage signal on the receiving end can be rewritten for zero flow as follows:

$$V(t) = V_o[G(t)] \sin \omega T_o \quad (5)$$

and for the non-zero flow as:

$$V(t) = V_o[G(t)] \sin \omega T_{12} \quad (6)$$

Since $T_{12}$ is less than $T_o$ by an amount $\Delta t_{12}$, equation (6) can be rewritten as:

$$V(t) = V_o[G(t)] \sin (\omega T_o - \omega \Delta t_{12}) \quad (7)$$

where $\omega T_o$ is equal to some reference angle $\Phi_o$ and where $-\omega \Delta t_{12}$ is equal to some change in phase angle $-\Delta \Phi$.

Also, the angular velocity of the wave ($\omega$) is equal to $2\pi f_C$, where $f_C$ is the frequency of the carrier wave. The angular velocity is therefore also equal to $2\pi k f_D$, where k is a constant. Because the frequency (f) of the wave remains the same during travel through the medium, so does the term $\omega$. The difference in travel time therefore corresponds to the change in the phase angle. Due to the small increment of change in travel time that is being measured, it has proved more practical to measure the change in phase angle that corresponds to this change in travel time.

The above analysis can also be applied to a wave traveling in the opposite direction—from PROBE 2 to PROBE 1—except that the change in phase angle will have an opposite sign ($+\Delta \Phi$) relative to the phase at zero flow.

If the difference is taken between the phase angle $\Phi_{12}$ corresponding to $T_{12}$ and the phase angle $\phi_{21}$ corresponding to $T_{21}$, and a constant is factored out to proportion the phase angle to the travel time, equation (3) can be rewritten as follows:

$$V' = K' \frac{(\phi_{21} - \phi_{12})}{(T_{12})(T_{21})} \quad (8)$$

where K' is a combination of various constants.

In the Lee patent, an assumption was made that $c \gg V$. This meant that either $T_{12}$ or $T_{21}$ could be taken to be L/c and that either one of the two travel times, $T_{12}$ or $T_{12}$ could be squared to obtain the denominator of equation (1) above.

The same assumption cannot be made for measurement of gas flow. The magnitude of V is not negligible in comparison with the sonic velocity (c). Also, the flow of gas generates components that cross the acoustic path. This causes the phenomena of "long pathing" of the sonic signal as it travels across the gas flow, and also causes the generation of noise in the acoustic signal.

Figure 5:
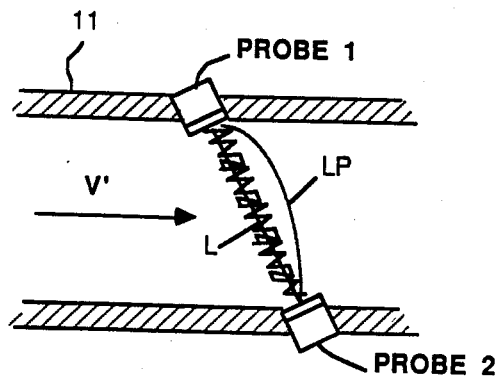
FIG. 5 is a detail schematic diagram that shows the effects of the gas flow on the acoustic signal.

In the long pathing condition illustrated by path LP in FIG. 5, the sonic signal does not follow the path L, the shortest path between PROBE 1 and PROBE 2. Instead it deviates from the path L, due to the greater effect of the velocity of the flow stream (V'). While it moves generally in the direction of the path L, it travels a greater distance, which might be conceived as the arcuate path LP between PROBE 1 and PROBE 2.

Noise may be caused by local turbulent flows which cause a number of small deviations from the shortest path for L. This is illustrated in FIG. 5 as the acoustic signal follows a zigzag path that crosses the shortest path path L numerous times. Again, the result is that the acoustic signal travels a longer distance than L.

Long pathing and noise each have the effect of extending travel times. In effect, an error would be present in the travel times $T_{12}$ and $T_{12}$ used in the calculation of equation (8) by presently available metering equipment, and this error has been an obstacle to applying ultrasonic flow meters to the high accuracy measurement of gas.

If the right hand sides of equations (1) and (2) in the above description are substituted for $T_{12}$ and $T_{12}$ in the denominator of equation (8), the following expression is provided:

$$V' = K'' \frac{(c^2 - V'^2 \sin^2 \theta)(\phi_{21} - \phi_{12})}{2L(\sin \theta)} \quad (9)$$

Because L, $\theta$ and sin $\theta$ are constants, the expression can be reduced, by combining the constants into a new constant K'', to the following:

$$V' = K''(c^2 - V'^2 \sin^2 \theta)(\Phi_{21} - \Phi_{12}) \quad (10)$$

In equation (10) there are two second order terms, the sonic velocity (c) and the axial flow velocity (V'). If the sonic velocity (c) can be determined, the equation will become a second order equation (quadratic equation) with V' as the variable to be determined.

The sonic velocity can be determined according to the following partial derivative, thermodynamic equation:

$$c = (dP)/(dr)_s \quad (11)$$

where:
c = sonic velocity
P = pressure
r = density and s = represents constant entropy The density (r) of a substance equals a mass (m) for a specified volume (V). With the volume (V) a predetermined constant, and with mass related to the weight (W) of a substance by a gravity constant (g), equation (11) can be rewritten as follows:

$$c = gV \frac{(P_1 - P_2)}{W_1 - W_2} \qquad (12)$$

where $P_1$ is a first pressure greater than a second pressure $P_2$, and where $W_1$ is a weight at pressure $P_1$ that is greater than a second weight $W_2$ at pressure $P_2$.

FIG. 1 shows an apparatus for measuring the phase difference $(\Phi_{21} - \Phi_{12})$ and sonic velocity (c) of equation (10) using, in particular, the relationship of equation (12) to determine sonic velocity, The apparatus then determines the flow velocity in the axial direction (V') using an iterative algorithm of the type well known in the computer art for evaluating second order equations. The first portions of the apparatus to be described are portions of an ultrasonic flow meter.

The apparatus of FIG. 1 includes a pulse train generator 12 that generates a digital signal at a frequency $k(f_D)$. To make the detection of phase changes less difficult, it is preferred that these changes be detected with reference to the difference frequency, $f_D$, which exhibits the same phase change as the carrier $f_C$, but which is lower in frequency by a factor k, which in this example is 13.47. In other embodiments using this signal mixing technique, the number k might be as high as fifty, for example. The difference frequency signal is obtained on the receiving end of each transmission by a signal mixing process to be described below.

Figure 2:
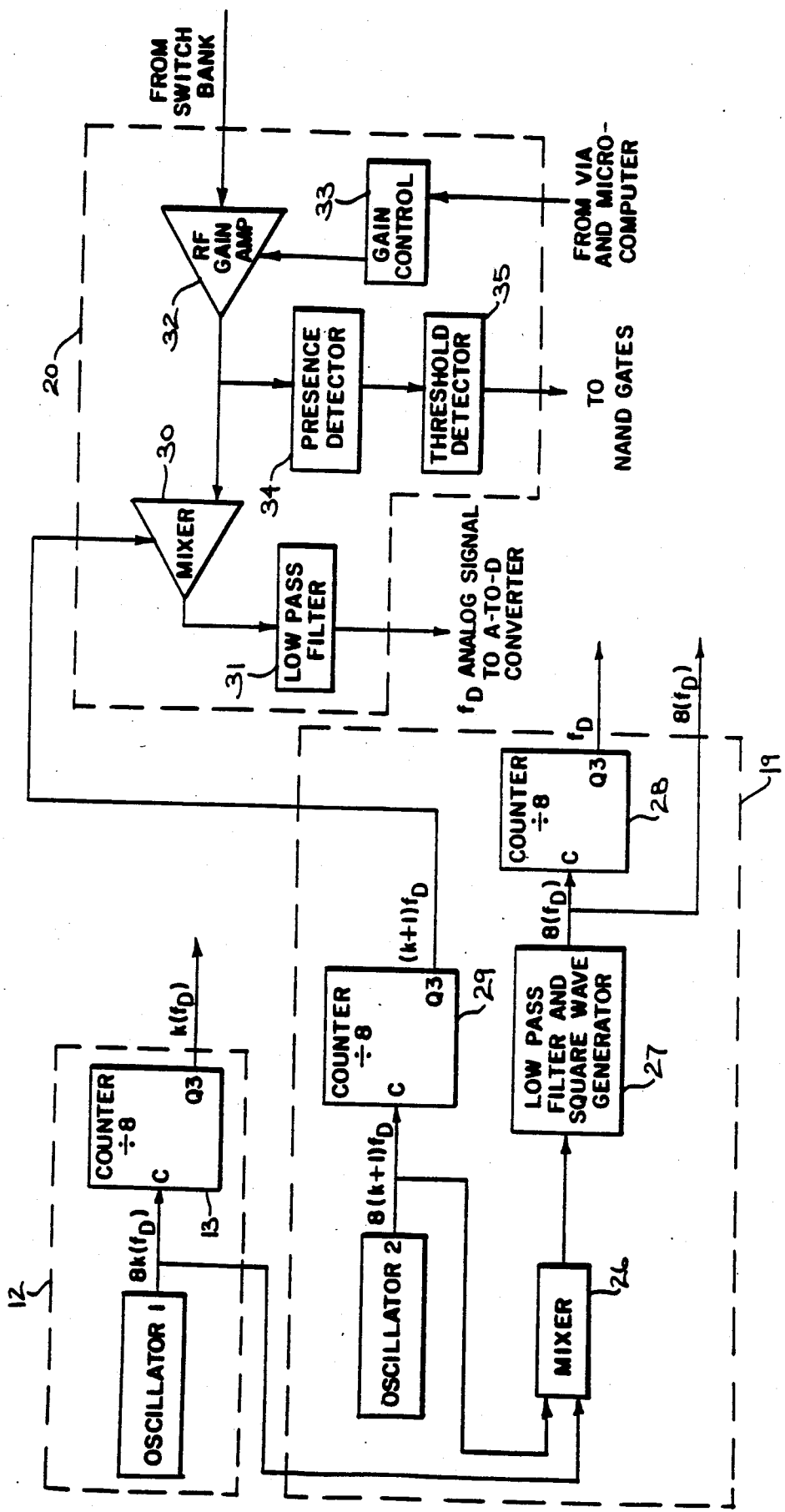
FIG. 2 is a more detailed block diagram of several circuits shown in FIG. 1.

As seen in FIG. 2 the generator 12 of FIG. 1 includes an OSCILLATOR 1 circuit and a counter 13. The OSCILLATOR 1 circuit is a crystal oscillator that generates clock pulses at a rate of $8k(f_D)$ Hz to the clock input (C) on the counter 13. The counter 13 produces a signal at its Q3 output to divide the clock input signal by eight.

Returning to FIG. 1, the output from the generator 12 is sent to a clock input (C) on a transmitter 14 that is essentially a gated power amplifier. The transmitter 14 generates a generally sinusoidal wave (XMIT in FIG. 4) at the frequency of the clock signal for a period in which the transmitter 14 is enabled at its XEN input. This provides a train of pulses at the carrier frequency, and this signal burst is routed to either PROBE 1 or PROBE 2 through an FET (field effect transistor) switch bank 15 having P1 and P2 outputs connected to PROBE 1 and PROBE 2, respectively.

The transmitter 14 is turned on and off by a microcomputer 16 which is the primary controlling element in the circuit 10. The microcomputer 16 sends data over a data bus 17 to control registers in a VIA (Versatile Interface Adapter). Specific control registers in the VIA are addressed through an address bus 18. When the microcomputer 16 outputs "10" (hex) to the "port A" register in the VIA, a signal is coupled from the A4 output on the VIA to a reset (R) input on a D-type flip-flop FF-1. The D and S inputs are not shown, but the D input is pulled to a logic high state and the S input is pulled to ground to allow the flip-flop FF-1 to be controlled at its reset input. The logic high signal from the A4 output is changed to a logic low signal by an inverter 50 in the line going to the reset input on the flip-flop FF-1. This logic low signal removes the reset and allows the flip-flop FF-1 to respond to clock signals.

Figure 4:
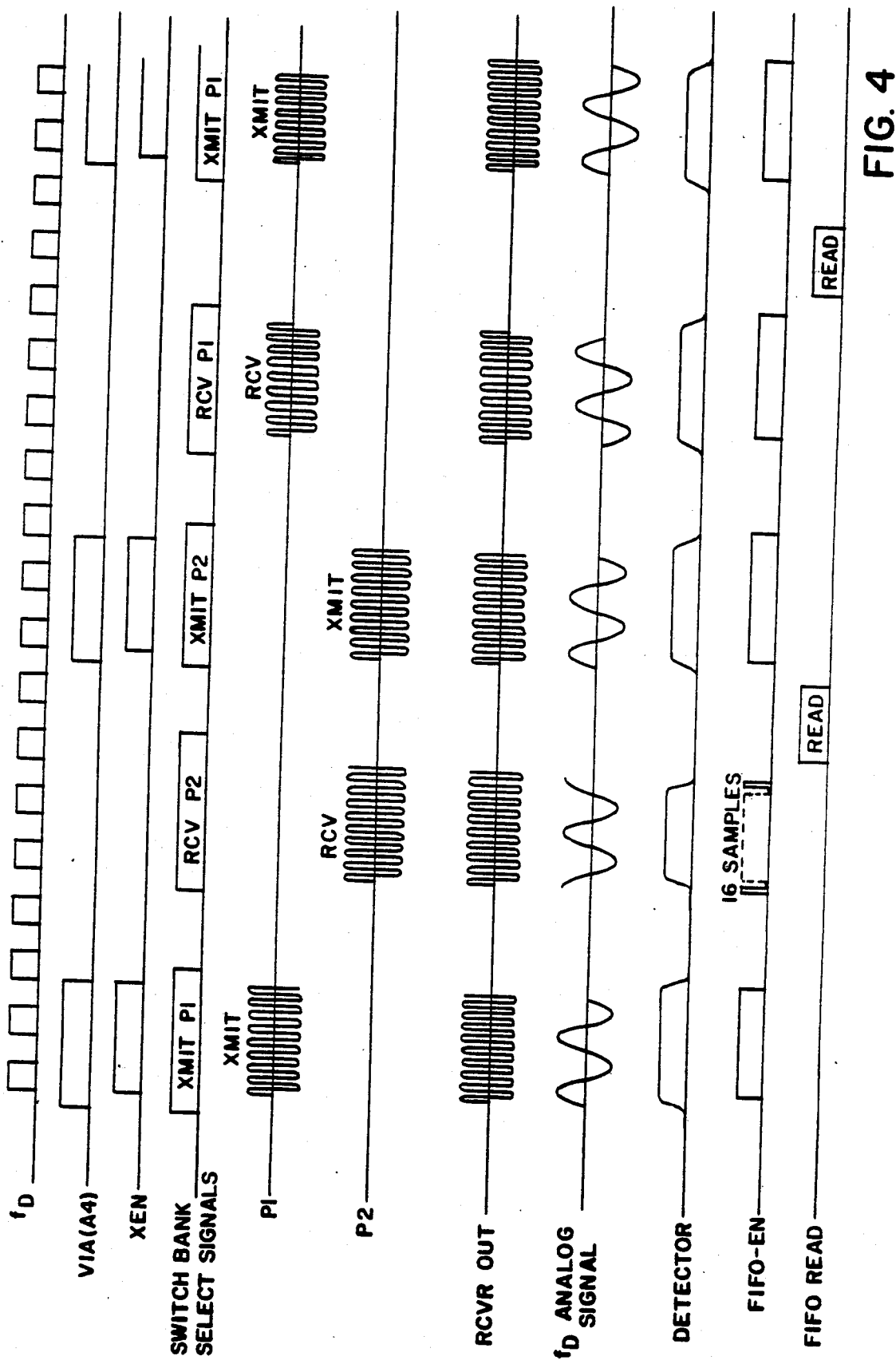
FIG. 4 is a graphical illustration of some of the signals that are processed by the circuit of FIGS. 1-3 as functions of time.

The switching of the flip-flop FF-1 is synchronized to the difference frequency signal $f_D$ represented in FIG. 4. This signal is coupled to the clock input (C) on the flip-flop FF-1 from a circuit 19 that generates various timing signals, including the difference frequency signal. After the instruction has been executed to remove the reset signal from the R input, the next rising edge of the clock signal will set the Q output of the flip-flop FF-1 to a logic high state and enable the transmitter 14 through the XEN input. When the transmitter 14 is to be turned off, the microcomputer 16 executes another instruction to reset the flip-flop FF-1 by switching the output from pin A4 on the VIA to a logic low state. Thus, a gating pulse XEN is seen in FIG. 4 which defines the number of cycles in each XMIT pulse train.

After the train of pulses has been transmitted to one of the probes, and has been received by the other, it is routed back through the FET switch bank 15 to a block of circuitry 20 in FIG. 1 that includes a second receiver, a mixer and a signal detector. The received (RCV) signal is illustrated in FIG. 4 as a train of pulses similar to the XMIT signal. From this RCV signal, the circuitry 20 extracts an analog signal of frequency $f_D$ seen in FIG. 4. This signal is fed to a very fast analog-to-digital converter 21 seen in FIG. 1, which is capable of conversions at a rate up to 15 MHz. The A-to-D converter 21 receives clock signals at its C input at a frequency of $8(f_D)$ so that eight conversions are made during each cycle of the signal being received from the receiver/mixer/detector circuitry 20. The digitized values are then conveyed as data to a digital wave memory 22 which takes a snapshot of the analog signal at eight different times during one cycle. This memory 22 is comprised of three first-in-first-out (FIFO) memory circuits.

As seen in FIG. 1, the memory 22 is enabled at an enable (EN) input by a signal from a pair of NAND gates 23. The NAND gates 23 in turn are enabled by a signal from the receiver/mixer/detector circuitry 20 when the pulse train has been transmitted and received through the switch bank 15. To synchronize the storage of converted digital values, the NAND gates are clocked by the same signal of frequency $8f_D$ that is used to clock the A-to-D converter 21. As shown in FIG. 4, the FIFO's receive and store sixteen samples in succession, over two cycles of the analog signal of frequency $f_D$. The FIFO's each have storage for sixteen bytes of data.

In measuring flow rate, a first pulse train is transmitted from PROBE 1 to PROBE 2 in FIG. 1 and a second analog signal of frequency $f_D$ seen in FIG. 4 is extracted and sampled. The resulting data is then read into the microcomputer 16 before transmission in the opposite direction. A second pulse train is then sent in the opposite direction, from PROBE 2 to PROBE 1, and a fourth analog signal of frequency $f_D$ seen in FIG. 4 is extracted and sampled and the data is stored in the memory 22. (The first and third analog signals of $f_D$ seen in FIG. 4 are signals detected to confirm transmission, while the second and fourth signals are those extracted from the RCV signals.) The microcomputer 16 reads the data before the next transmission by transmitting FIFO READ control signals on the control bus 24 seen in FIG. 1. The time interval for the "read" operation is shown in FIG. 4.

The analog signals are sampled and compared to detect a difference in phase angle corresponding to the effect of the fluid flow on the respective travel times. The receiver/detector circuit 20 may exhibit timing instability or drift due to the effects of temperature and electrical noise. If this occurs, there could be a delay in the response of the detector that is variable from one reception to the next. To enable the signal processing circuit 10 to operate independent of such conditions a reference is provided. This reference is the clock signal of frequency $f_D$ seen in FIG. 4 which is generated by the timing signal circuit 19 and which is transmitted to one data input on the wave memory 22. This signal provides individual "timing marks", each of which is stored with a respective eight-bit value of the analog signal of frequency $f_D$ that has been converted by the A-to-D converter 21. When the data is read by the microcomputer 16, it also reads the timing marks. It then uses the timing marks to "shift" or align the two digitized waveforms for a correct comparison of phase difference based on a common reference—the timing marks.

Although the sampled analog signal and the reference clock signal in the preferred embodiment are of frequency $f_D$ as a result of the signal mixing process described above, other embodiments may sample a higher frequency signal such as the carrier frequency signal, using a high frequency clock signal that samples succeeding cycles at different points. These embodiments are also contemplated as being within the scope of the invention, but these embodiments are not preferred, because the sampling of such higher frequency signals makes the signal processing circuit more susceptible to the adverse effects of electrical noise.

Figure 3:
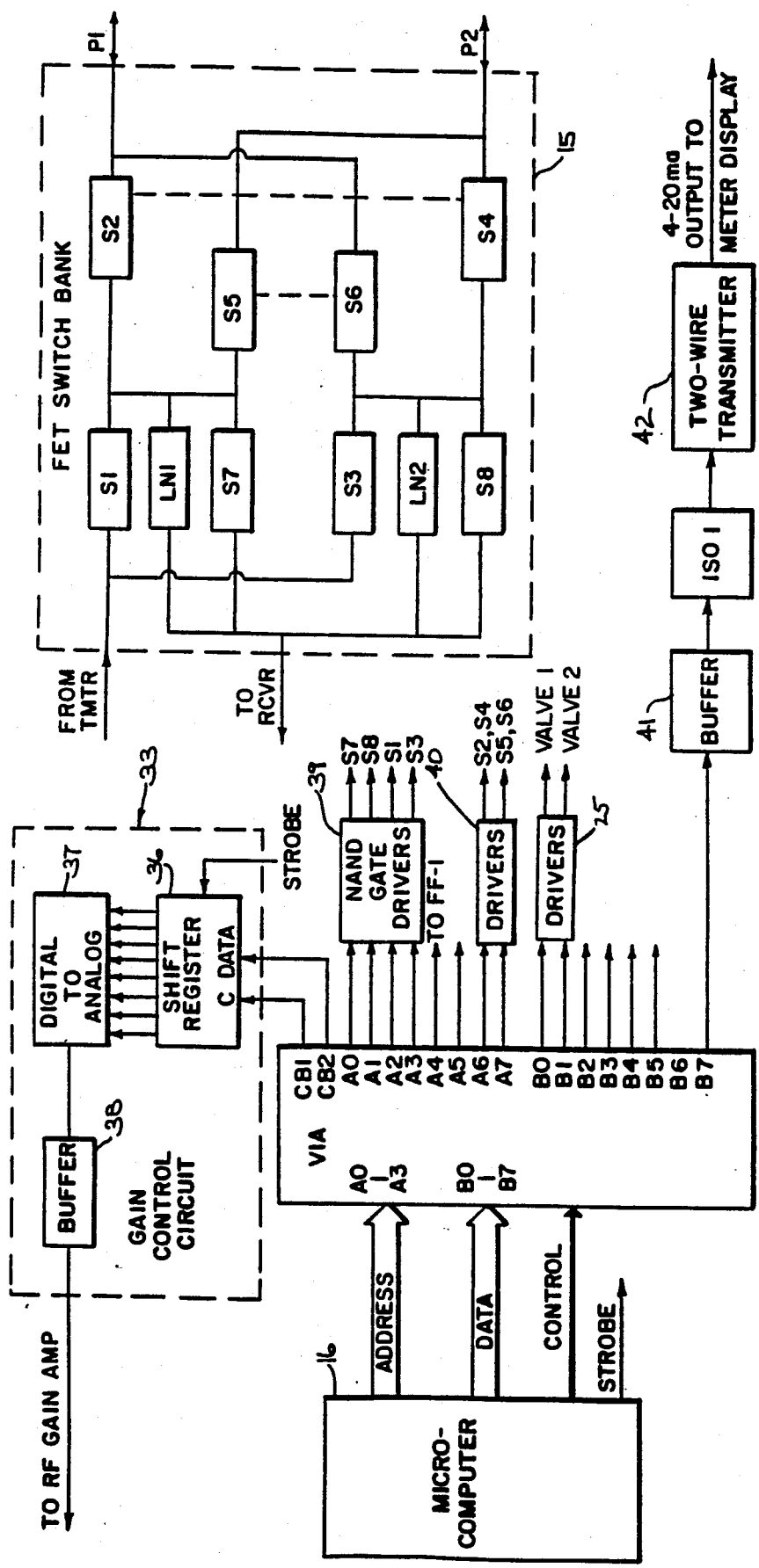
FIG. 3 is a schematic diagram showing details of the VIA circuit and the FET switch bank shown in FIG. 1.

The circuit elements of FIG. 1 shall now be examined in more detail as illustrated in FIGS. 2-3. FIG. 2 shows the circuit 19 for generating digital timing signals of frequency $f_D$ and $8(f_D)$, as well as for generating signals used in mixing the transmission and reception signals to obtain signals at the difference frequency $f_D$. This circuit 19 includes an OSCILLATOR 2 circuit similar to the OSCILLATOR 1 circuit, except for the frequency of the crystal oscillator, which is selected to generate a digital pulse train at a frequency of $8(k+1)f_D$.

The outputs of the OSCILLATOR 1 and OSCILLATOR 2 circuits are coupled to the inputs of a mixer 26, which in this embodiment is an ex-OR gate. When the inputs to the mixer 26 are at different logic states, the rising edge of a pulse will be generated at its output. When the inputs become the same again, the falling edge of the pulse will be generated. The pulses will therefore be generated at about twice the frequency of either input, but the pulses will be of varying pulse width. This signal will contain components representing the sum and the difference of the two input signals. By coupling this composite signal through a low pass filter and square wave generator circuit 27, a digital signal of frequency $8(f_D)$ is produced. To obtain a signal at the difference frequency $f_D$, the output of the circuit 27 is coupled to a clock input C on a counter 28 to generate an output signal at its Q3 output at one-eighth the frequency of the clock input. This signal is used to clock the flip-flop FF-1 and to generate the timing marks to the digital wave memory in FIG. 1.

Still referring to FIG. 2, the signal from the OSCILLATOR 2 circuit is also coupled to a clock input C on another divide-by-eight counter 29. This produces a digital signal of frequency $(k+1)f_D$ that is coupled to a mixer 30 for mixing with the reception signal. To mix the analog reception signal with the digital signal, a linear amplifier is used as the mixing circuit 30, and the digital input is coupled to a gain control input on the amplifier. The digital signal turns the amplifier on and off at the frequency $(k+1)f_D$. The output of the mixer 30 is therefore a chopped version of the reception signal that includes both the sum of the frequencies of the two mixer inputs, and the difference of the frequencies of the two mixer inputs. The mixer output signal is coupled to the input of a low pass filter 31 to filter out the sum frequency signal, and allow only an analog signal of frequency $f_D$ to pass to the analog input of the A-to-D converter 21 in FIG. 1.

Also seen in FIG. 2 are other details of the receiver/detector/mixer circuitry 20. The reception signal is routed from the switch bank 15 in FIG. 1 to an RF (radio-frequency) gain amplifier 32. The gain of this amplifier 32 is controlled from the microcomputer 16 through a gain control circuit 33, which will be described in more detail below in relation to FIG. 3. The output of the amplifier is sent to the input of a presence detector 34, which converts a radio frequency signal in a certain frequency range to a DC signal. Such a circuit is also known as a coherent detector. The output of the presence detector 34 is connected to the input of a threshold detector 35 for detecting a reception signal of suitable magnitude for conversion and storage. It is the output from this presence detector that enables the NAND gates 23 in FIG. 1.

FIG. 3 shows how the microcomputer 16 interfaces to the gain control circuit 33 and to the FET switch bank 15, as well as the details of those two circuits 15 and 33. The microcomputer 16 transmits control information to the VIA, which uses outputs CB1 and CB2 as a serial output port. Serial clock signals are transmitted from output CB1 to a clock input C on a shift register 36. Data signals are transmitted from output CB2 to a DATA input on the shift register 36. When a byte of data has been transferred, a STROBE signal is sent to the shift register 36 from the microcomputer 16 to transfer the data to an output latch included in the shift register circuit 36. The outputs of the shift register are always enabled, so the data will then be coupled to the inputs of a digital-to-analog converter 37. The output of this circuit 37 is a DC signal, which is coupled through a voltage following amplifier that serves as a signal buffer 38. The output of this buffer 38 becomes the input to the RF gain amplifier 32 in FIG. 2.

Also seen in FIG. 3 are the details of the FET switch bank 15. Each of the switches S1–S8 includes a pair of field effect transistors and a protective diode. The switches S1–S8 have control inputs (not shown) by which they are switched on (closed) and off (open). The signals to these control inputs are the outputs from the NAND gate drivers 39 and voltage following drivers 40. The output from the NAND gate driver 39 labeled S7, for example, controls the switching of switch S7. The microcomputer 16 turns individual switches in the switch bank 15 on and off by transmitting control data to the VIA. This data appears at outputs A0–A7 in I/O port "A" of the VIA.

Some of the switches S1–S8 operate in tandem. Switch S2 is always switched to the same on or off state as switch S4. Similarly, switches S5 and S6 are operated together.

The signal from the transmitter 14 is coupled along one signal path through switches S1 and S2 to output P1, assuming that both of these switches are closed.

This signal can also be coupled through switches S3 and S6 to output P1. If it is desired to route the transmission signal to output P2, this can be accomplished by closing switches S1 and S5, or by closing the combination of switches S3 and S4.

A signal received at output P1 can be routed to the receiver circuitry by closing switches S2 and S7 or by closing switches S6 and S8. A signal received at output P2 can be routed to the receiver circuitry by closing switches S4 and S8, or by closing switches S5 and S7.

Also included in the switch bank 15 are two leakage networks LN1 and LN2. When a signal is transmitted to output P1 by closing switches S1 and S2, the leakage network LN1 provides a path for current to the receiver circuitry 20.

The above-described circuitry is capable of generating multiple signal transmission sequences for different pairs of probes in a system with more than one pair of probes. In its broadest application, the invention requires only one pair of probes and two signal transmission sequences, and therefore the discussion of the program will be directed to such a system. For one pair of probes, a first transmission is sent from the upstream probe (PROBE 1 in FIG. 1) to the downstream probe (PROBE 2 in FIG. 1), and a second transmission is sent in the opposite direction (from PROBE 1 to PROBE 2 in FIG. 1). Probe selection, the mode of transmission or reception, and the setting of the switches S1-S8 are correlated in Table 1 below. Also shown are FIFO states in which the FIFO's are receiving either wave data extracted from a signal sent downstream (FIFO DN) or wave data extracted from a signal sent upstream (FIFO UP) in the pipe 11.

TABLE 1

| PROBE | MODE | $S_1$ | $S_2$ | $S_3$ | $S_4$ | $S_5$ | $S_6$ | $S_7$ | $S_8$ | DN | UP |
|---|---|---|---|---|---|---|---|---|---|---|---|
| 1 | XMIT | 1 | 1 | 0 | 1 | 0 | 0 | 0 | 0 | | |
| 2 | RCV | 0 | 1 | 0 | 1 | 0 | 0 | 0 | 1 | X | |
| 2 | XMIT | 0 | 1 | 1 | 1 | 0 | 0 | 0 | 0 | | |
| 1 | RCV | 0 | 1 | 0 | 1 | 0 | 0 | 1 | 0 | | X |

Referring to FIG. 4 and the above Table 2, it will be seen that during the first XMIT cycle the switch bank 15 is enabled for transmission through terminal P1 and PROBE 1. During the first RCV cycle, the switch bank is enabled for reception through PROBE 2 and terminal P2. In the second XMIT cycle, the switch bank 15 is enabled for transmission through terminal P2 and PROBE 2 and, in the second recycle, for reception through PROBE 1 and terminal P1. It should now be apparent how the microcomputer 16 controls the switch bank 15 from the outputs of the VIA and how confirmation signals are provided for each transmission signals by leakage through the switch bank 15 into the receiver.

The VIA has a second I/O port in which terminal B7 conveys an output signal from the microcomputer 16 at a signal frequency that is proportional to the flow rate calculated by the microcomputer 16. This signal is coupled through a buffer 41 to an isolation circuit ISO 1 which is also a frequency-to-voltage converter. The resulting DC voltage signal is fed to a two-wire transmitter 42. The output from this transmitter 42 is a DC signal in the range of 4–20 milliamps, which corresponds to the range of flow rate from zero flow to a full-scale flow for the flow meter.

This completes the description of the portion of the apparatus that measures the phase difference $(\Phi_{21} - \Phi_{12})$. For further information concerning the circuitry mentioned above, including a list of commercially available components, reference is made to a copending application of Vander Heyden, Ser. No. 716,471, filed Mar. 27, 1985.

The next part of the description concerns a portion of the apparatus that can be used to measure the sonic velocity (c) according to equation (12). Referring to FIG. 1, a load cell 43 includes an enclosure 44 that encloses a non-expanding chamber 45 of a known, fixed volume. The enclosure 44 is well insulated to prevent heat from entering or leaving the chamber 45. A sample of the gas that is flowing through the pipe 11 at operating pressure and temperature is diverted through a first port 49 in pipe 11 and is conveyed through a first gas sensing line 50 and an inlet 51 into the chamber 45.

A pair of valves, VALVE 1 and VALVE 2 have been added to a load cell 43 of the type used in a Z-meter, so a change in pressure can be effected in the chamber 45. VALVE 1 is placed in a line 50 that connects port 49 to inlet 51 and VALVE 2 is placed in line 52 connecting an outlet 53 from chamber 45 to a second port 54 in the pipe 11. The valves are solenoid-actuated valves which are electrically controlled by the microcomputer 16. The microcomputer 16 transmits control signals to the valves through outputs B0 and B1 of the VIA and suitable drivers 25 seen in FIG. 4.

Figure 6:
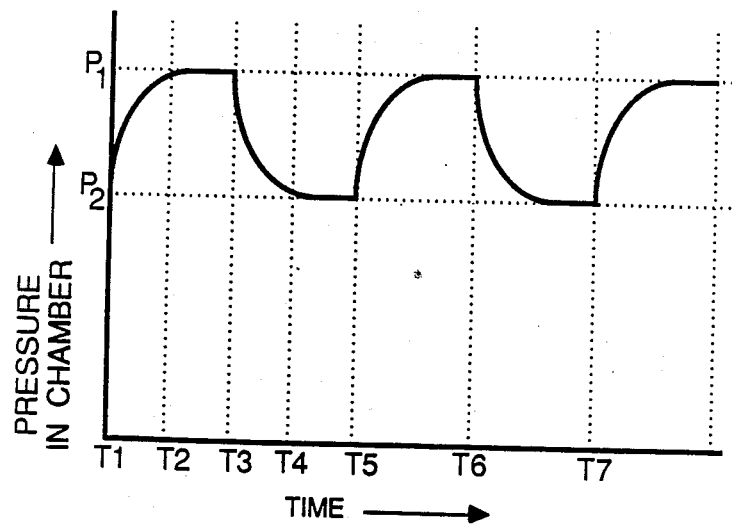
FIG. 6 is a graph of pressure in the chamber in FIG. 1 as a function of time.

To obtain a sample of gas, VALVE 1 in a gas sensing line 50 in FIG. 1 is opened, while VALVE 2 in a gas exhaust line 52 is held closed. With VALVE 1 open and VALVE 2 closed, pressure will build up in the chamber 45 until it reaches a pressure $P_1$ that is representative of the operating pressure in the pipe 11. This is illustrated in FIG. 6, where T1 represents the time that VALVE 1 is opened, and where T2 represents the time when pressure $P_1$ is reached. To stabilize the pressure $P_1$ for measurement, both valves may be held closed for a period from T2 to T3.

As seen in FIG. 1, the pressure $P_1$ is sensed by a pressure sensor 46 attached to the enclosure 44. The pressure sensor 46 generates an analog signal to an analog-to digital input on the microcomputer 16.

At time T3 in FIG. 6, VALVE 1 is closed and VALVE 2 is opened. This relieves some of the pressure through the exhaust line 52 to produce a lower pressure $P_2$ at time T4. Both valves are held closed from time T4 to time T5 to stabilize the gas in the chamber 45 for measurement by the microcomputer 16. In response to this lower pressure $P_2$, the pressure sensor 46 in FIG. 1 provides a second analog signal to the microcomputer 16. The microcomputer 16 converts the first and second analog signals to digital numbers and calculates the difference to find the difference in pressure $P_1 - P_2$. This difference in pressure is the quantity in the numerator of equation (12) for sonic velocity (c). The next pressure measurement cycle starts at time T5 with the opening of VALVE 1 and continues through times T6 and T7. Pressure differences are measured continuously by repeating this cycle.

In this example, the gas exhaust line 52 in FIG. 1 connects the outlet 53 from the chamber 45 to the second port 54 on the pipe 11, which is downstream of the first port 49 and the probes. A bend in the pipe 11 assures a pressure differential between the two ports 49 and 54. To practice the invention it is not necessary that gas from the chamber 45 be returned to the gas pipe 11. Gas could be exhausted from the chamber 45 to any region of lower pressure to provide the change the pressure that is needed to determine sonic velocity. It should also be apparent that although this example uses a drop in pressure, it would also be possible to measure a rise in pressure to obtain a pressure difference.

The enclosure 44 rests on a weight sensing device 48. When the gas in the chamber 45 reaches a first pressure that is representative of operating pressure in the pipe 11, a first weight ($W_1$) is sensed. The weight sensor 48, like the pressure sensor 46, generates an analog signal to an analog-to-digital input on the microcomputer 16. After VALVE 2 is opened and the pressure has been allowed to drop, a second weight ($W_2$) of the sample is sensed, and a second analog signal is transmitted by the sensor 46 to the microcomputer 16. With the volume (V) of the chamber 45 being provided to the microcomputer 16 as a constant, the sonic velocity (c) can be determined according to equation (12) by calculating the change in pressure ($P_1 - P_2$) with respect to the change in weight ($W_1 - W_2$) and multiplying by a constant.

Besides sensing pressure and weight, the microcomputer 16 also senses temperature through a temperature sensor 47 mounted on the enclosure 44. This sensor 47, like the other sensors 46, 48 is connected to an analog-to-digital input on the microcomputer 16. Pressure and weight differentials are measured over a short time to minimize temperature change. Also, the insulation of the enclosure 44 helps minimize temperature change. It is desireable, however, to monitor temperature so that meter measurements can be converted to a reference pressure and temperature.

The preferred circuit for the microcomputer 16 is one of the MC68HC11 series single-chip microcomputers offered by Motorola Inc. of Phoenix, Ariz. The A8 version of this microcomputer includes a CPU, 256 bytes of random access memory, 512 bytes of electrically erasable and programmable read-only memory (EEPROM) and up to 8k bytes of read-only memory (ROM). A development version of this microcomputer is preferred for development of a program for the 8k ROM.

This particular microcomputer also includes five I/O ports. Ports B and C shown in FIG. 1 connect to the address and data buses 17 and 18. The upper eight bits of a sixteen-bit address are transmitted through Port B. The lower eight bits of the address and eight bits of data are multiplexed through Port C. Port E is of particular interest because it provides analog-to-digital inputs. Analog signals are received at these inputs and converted to eight-bit-numbers by the microcomputer 16 for further processing. Four of these inputs are available in the 48-pin dual-in-line version of the circuit and eight inputs are available in a 52-pin version, which has leads on four sides.

The instruction set for this circuit is an expanded version of the instruction set previously used with the M6800 series microcomputers also available from Motorola Inc.. For further information concerning the architecture, operation and instruction set for the MC68HC11 Series Microcomputers reference is made to the commercial literature and specifications for the product which are available from Motorola, Inc.

The remaining portion this description concerns a program of microcomputer instructions that are executed to measure flow rate and to generate the output signal discussed earlier in relation to FIG. 4. This program may be stored in an external EPROM (erasable programmable read-only memory) (no shown) or in the on-board ROM.

Figure 7:
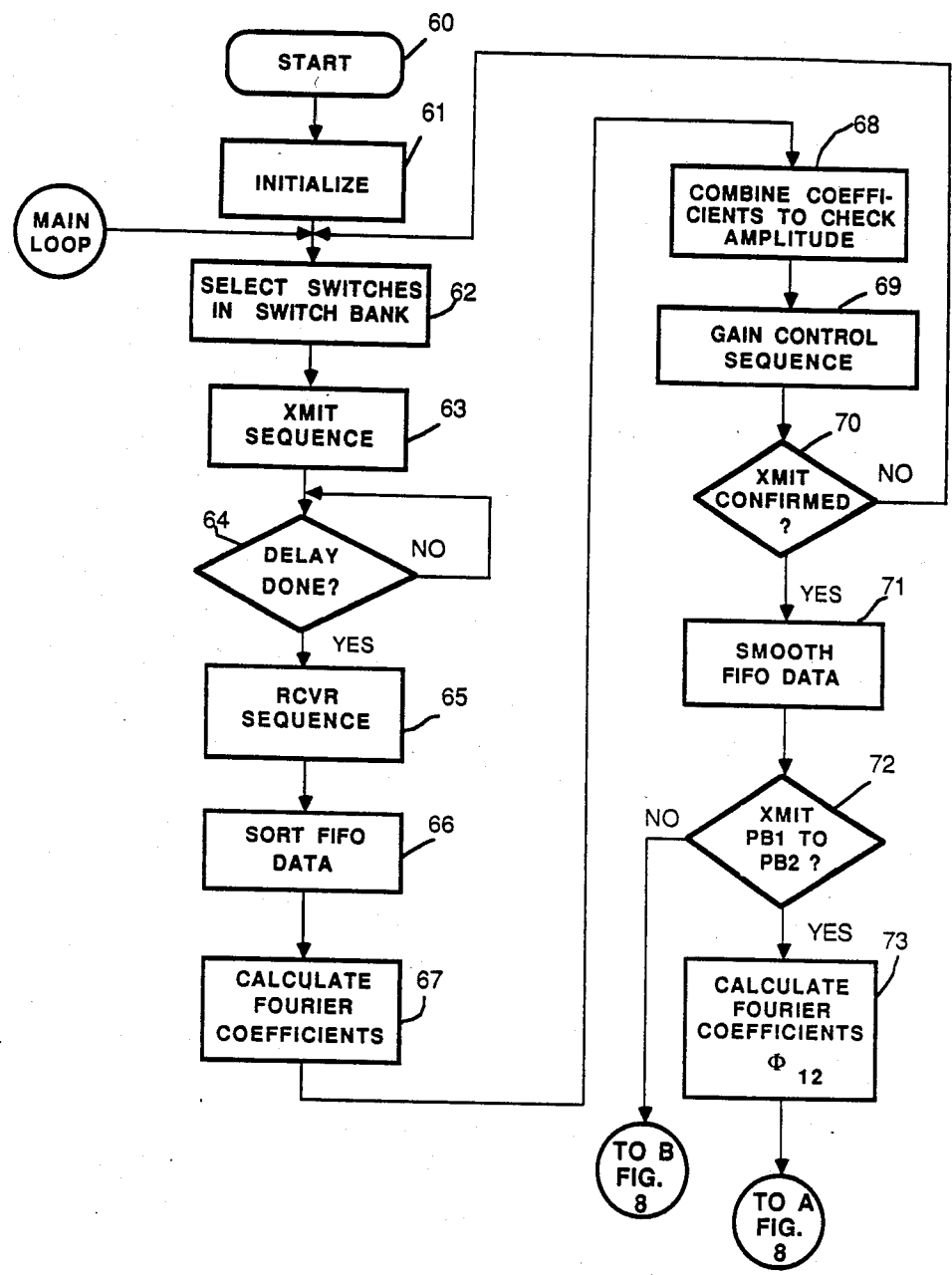
FIGS. 7 and 8 provide a flow chart of the program executed by the microcomputer of FIG. 1.

Referring to FIG. 7, the start of the program is represented by a start block 60. An INITIALIZATION sequence represented by process block 61 is executed to select functions for the I/O ports of the VIA, to set initial values of gain for the gain control circuit 33, and to initialize the counters in the VIA. A pointer is set to a location in memory where data will be received from the FIFO's. Next, as represented by process block 62, the switches in the switch bank 15 are selected according to the data in the first line of Table 1 above. Block 62 also represents a return point which has been labeled "MAIN LOOP".

Process block 63 represents the execution of the first operational sequence, which is a XMIT sequence. First, the gain for the receiver is fetched and sent out to the VIA to control the signal amplification of the RF gain amplifier 32. Then the FIFO's are reset to zero. Control data is then sent to the VIA to enable the switch bank 15 through I/O port A according to the first line in Table 1 above.

Before sending out the transmission pulse train, a time-out counter is set up to count the number of times that the microprocomputer 16 can look for a signal leaked back through the receiver to confirm the transmission. This signal is detected by determining that a counter has started counting and has reached a certain number of counts.

The microprocomputer 16 then starts the transmitter 14 by loading the appropriate data in the VIA to set the flip-flop FF-1 and enable the transmitter 14 at its XEN input. Assuming that the confirm signal has been received and the high resolution counter 25 has started counting, the microcomputer 16 will detect the count and then load the appropriate data in the VIA to reset the flip-flop FF-1 and disable the transmitter at its XEN input. Finally, other instructions are executed to load further data into the VIA to open-circuit all of the switches in the switch bank 15.

Referring to decision block 64, the MAIN LOOP includes several instructions after the return from the XMIT sequence to provide a delay before the receiver (RCVR) sequence can be called. The effect of this is seen in FIG. 4, where the switch bank select signals are off for a time between transmissions (XMIT's) and receptions (RCV's). This allows any delayed signals in the receiver to dissipate before measurement of the reception signal is attempted. Assuming that the delay is complete (represented by the YES branch from block 64 in FIG. 7) and the RCVR sequence represented by process block 65 is executed.

The first function during the RCVR subroutine is the output of appropriate data to the VIA to set the switches in the switch bank to the states in the second line of Table 1 above. The microprocomputer 16 executes a timing sequence corresponding to the longest expected travel time, and at the end of this sequence, disables the switch bank 15.

The microcomputer 16 next processes the data stored in the FIFO's as the result of the transmission across the flow stream. Process block 66 in FIG. 7 represents execution of sequence to sort out the data that will be used to determine a phase difference. For further description of the data that is stored in the FIFO's, reference is made to the application of Vander Heyden, Ser. No. 716,471 filed Mar. 27, 1985.

The wave data from the FIFO's is analyzed in two ways using Fourier mathematical methods. With these methods, the periodic signal of frequency $f_D$ that is received from the low pass filter 31 in FIG. 2 can be analyzed to determine (1) its magnitude or largest instantaneous value and (2) its phase. A Fourier series can be expressed as follows:

$$f(t) = a_0 + a_1 \cos w_0 t + a_2 \cos 2w_0 t + \ldots + a_n \cos nw_0 t \\ \ldots + b_1 \sin w_0 t + \ldots + b_n \sin nw_0 t + \ldots \quad (13)$$

The above series may also be expressed in a number of alternative ways, one of which is obtained by recognizing that for all n, $$a_n \cos nw_0 t + b_n \sin nw_0 t = c_n \cos (nw_0 t + \Phi_n) \quad (14)$$

where:

$$c_n = \sqrt{a_n^2 + b_n^2} \text{ and } \Phi_n = \tan^{-1}\left(\frac{-b_n}{a_n}\right) \quad (15 \text{ and } 16)$$

The coefficient $c_n$ is the amplitude and the term $\Phi_n$ is the phase of the nth harmonic. The term $\tan^{-1}$ is the inverse tangent and $\Phi_n$ is the angle with a tangent defined by the ratio of $-b_n/a_n$.

Referring to process block 67 in FIG. 7, the Fourier coefficients are first calculated to determine amplitude. To obtain the Fourier coefficients, the sine and cosine values for the various harmonics are stored as constants in memory. Each of the eight samples from the FIFO's is multiplied by the sine and cosine values for the fundamental frequency to obtain the $a_1$ and $b_1$ coefficients. These are each squared and the square is summed according to equation (15) to obtain the square of the $c_1$ coefficient. This combination of coefficients is represented by process block 68 in FIG. 7.

The microcomputer 16 next executes a GAIN CONTROL sequence represented by process block 69. This sequence compares the sum of the squares of the Fourier coefficients to certain predetermined constants to evaluate the strength of the signal being received through the RF gain amp 32. If the signal is too weak, certain gain control variables will be incremented, and when these are coupled to the gain control circuit, the gain will be increased. If the signal is too strong, the gain control variables are decremented and when these are coupled to the gain control circuit, the gain will be decreased. To prevent constant changing of the gain, a certain tolerance is programmed into the routine, so that minor adjustments will not be put into effect immediately.

Next, an error sequence subroutine is called to perform a test represented by decision block 70 to determine whether there has been a confirmation signal confirming a transmission. If no transmission is not confirmed, the microcomputer 16 returns to the entry point for the MAIN LOOP. If the transmission is confirmed, the microcomputer 16 executes further instructions represented by decision block 71. Process block 71 represents the execution of an sequence in which the FIFO data for $T_{12}$ and $T_{21}$ is blended with previously accumulated FIFO data according to a "smoothing" function.

The smoothing function implements changes in a digital system over a number of cycles. The smoothing function is analagous to an RC circuit as it charges to the applied voltage over a period of time determined by the timing constant for the circuit.

Next, the microcomputer 16 determines which transmission sequence is being executed. As represented by decision block 72, it first checks for transmission from PROBE 1 to PROBE 2. If this is the sequence being executed, a sequence is executed, as represented by process block 73, to calculate the Fourier coefficients for finding the phase angle $\Phi_{12}$ according to equation (16) above.

Figure 8:
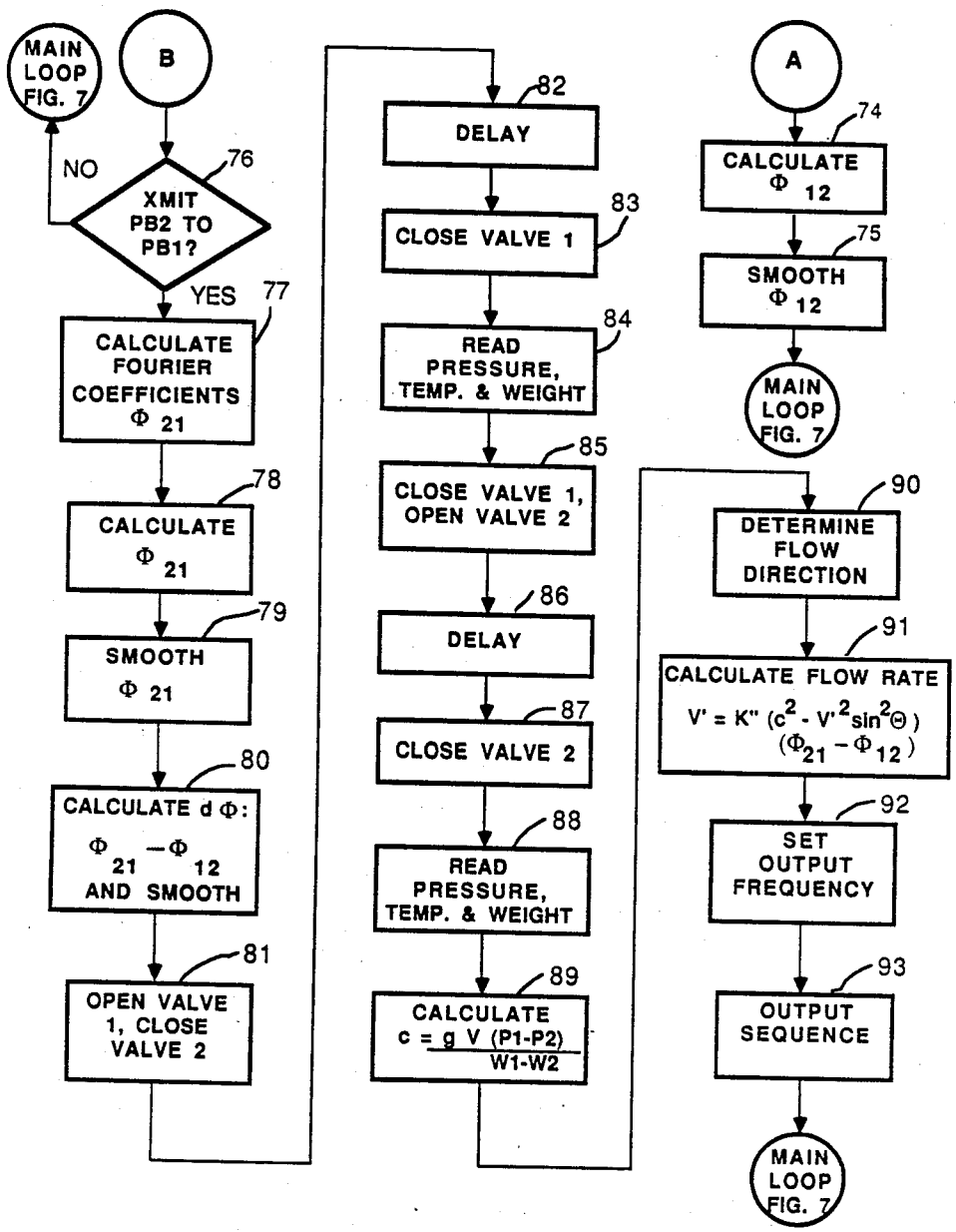

As represented by the next process block 74 in FIG. 8, the phase angle is actually calculated by executing a further sequence that performs the inverse tangent calculation by dividing a circle into octants of 45° each and by shifting the angle to one of the quadrants where the range of values for the inverse tangent function are between zero and one. The magnitude of the inverse tangent function is then calculated and stored in memory. Next, as represented by process block 75, a smoothing function is applied to blend the most recent value of $\Phi_{12}$ with a history of values accumulated for that angle. After this operation, the microcomputer loops back to the MAIN LOOP entry point in FIG. 7.

Returning to decision block 72 in FIG. 7, if the result is negative, as represented by the "NO" branch, further instructions represented by decision block 76 in FIG. 8 are executed to check for a transmission from PROBE 2 to PROBE 1. If so, the Fourier coefficients for the angle $\Phi_{21}$ are calculated by executing a sequence represented by process block 77. A sequence is then executed to calculate the angle $\Phi_{21}$ as represented by process block 78. This result is then "smoothed" into another location for $\Phi_{21}$ as represented by process block 79.

Returning to decision block 76, if a transmission is not detected in either direction, some type of error analysis should be used. As this is beyond the scope of the basic concept disclosed herein, this is represented as a return to the MAIN LOOP entry point in FIG. 7, with the understanding that various error handling sequences could be employed.

Assuming that transmissions and receptions have been accomplished in both directions and that data for $\Phi_{12}$ and $\Phi_{21}$ has been accumulated, a sequence represented by process block 80 is called to circulate the difference between the phase angles, and the result is "smoothed" into a location in memory from which data will be read later for the flow rate calculation.

The microcomputer 16 then executes a sequence represented by blocks 81–89 to take readings from the load cell 43 and to calculate sonic velocity. In doing this, the microcomputer 16 controls the opening and closing of VALVE 1 and VALVE 2 through the VIA seen in FIG. 3 and in the time sequence seen in FIG. 6. While the blocks 81–89 have been shown as a sequence following the earlier described blocks of the program, it should be appreciated that these functions might be rearranged so as to be performed in a more concurrent fashion with those earlier described blocks.

As represented by process block 81, the microcomputer 16 first executes one or more output instructions to open VALVE 1 and to assure that VALVE 2 is held closed. Next, instructions represented by process block 82 are executed to produce the delay from T1 to T2 in FIG. 6, which is necessary to allow pressure in the chamber 45 to reach pressure $P_1$. Instructions represented by block 83 are executed to close VALVE 1 to stabilize the gas in chamber 45 for measurement. Then, as represented by process block lock 84, a first set of readings for pressure (P), temperature (T) and weight (W) are taken by sensing these parameters at the analog inputs of the microcomputer 16 and converting the analog signals to bytes of data within the microcomputer 16.

To set up for taking a second set of readings, instructions represented by process block 85 are executed to close VALVE 1 and to open VALVE 2. These instructions are executed at time T3 in FIG. 6. Then, instructions represented by process block 86 are executed to delay for a period from T3 to T4 to allow pressure to drop to $P_2$. At time T4 instructions represented by process block 87 are executed to close VALVE 2 to again stabilize the gas within the chamber 45. Then, as represented by process block 88, a second set of readings for pressure (P), temperature (T) and weight (W) are taken by the microcomputer 16.

The gravity constant (g) and a volume constant (V) are stored in non-volatile memory. Using these constants and the readings taken from the load cell 43, the microcomputer 16 can now calculate the sonic velocity (c) according to equation (12), and this it does by executing instructions represented by process block 89.

Before calculating flow rate, a sequence represented by process block 90 is executed to determine the direction of flow in the pipe 11 and to set or clear a bit that will later be used in signaling the direction of the flow. Then, as shown by process block 91, the flow rate calculation is performed according to equation (10). This results in a number from zero to one that is a fraction of the full-scale flow.

Then a process block 92 will be executed to execute a sequence to determine a frequency for an output signal that is based on the fraction of full-scale flow calculated by executing process block 90. The result is stored as data that is accessible by an OUTPUT sequence that is executed next as represented by process block 93. By executing this routine, the microcomputer 16 sets up the VIA to generate an output signal from output B7 at the desired frequency. This frequency is then converted by the ISO 1 circuit in FIG. 3 to a DC signal that is transmitted by the two-wire transmitter 42 to the meter display. After executing block 63, the microcomputer 16 returns to MAIN LOOP re-entry point.

Thus, it can be seen how the microcomputer 16 controls the measurement of flow rate. The details of this description have been provided to describe a specific example, but those skilled in the art will recognize that these details may be varied while still practicing the basic concepts of the invention. Therefore, to distinguish that which has been given by way of example, from that which is basic to the invention, reference is made to the claims that follow this description.

I claim:

1. A method of measuring the rate of flow in an axial direction for a gaseous medium flowing through a pipe, the method comprising:
    transmitting a first sonic signal across the flow of gaseous medium from a first probe to a second probe;
    transmitting a second sonic signal across the flow of gaseous medium from the second probe to the first probe;
    receiving the sonic signals and determining a difference that is proportional to a travel time difference between a first travel time for the first sonic signal and a second travel time for the second sonic signal;
    controlling intake and release of a fixed volume sample of the gaseous medium to measure a difference in pressure of the gaseous medium;
    measuring a difference in weight corresponding to the difference in pressure for the fixed volume sample of the gaseous medium to determine a difference in density;
    determining the sonic velocity of the signals traveling through the gaseous medium in response to the difference in pressure with respect to the difference in density; and
    in response to the difference proportional to the travel time difference and to the sonic velocity, determining the rate of flow in the axial direction for the gaseous medium flowing through the pipe and generating an output signal proportional thereto.

2. The method of claim 1 wherein the first and second sonic signals are transmitted diagonally between the first and second probes.

3. The method of claim 1, wherein the controlling step comprises:
    establishing fluid communication between the pipe and a chamber of fixed volume for receiving a sample of the flowing gaseous medium in the chamber;
    allowing pressure in the chamber to reach a first pressure representative of pressure in the pipe;
    sensing the first pressure;
    interrupting fluid communication between the chamber and the pipe and establishing fluid communication between the chamber and an outlet for the gaseous medium;
    allowing pressure in the chamber to reach a second pressure;
    sensing the second pressure; and
    determining the difference between the first pressure and the second pressure.

4. The method of claim 3, wherein measuring the difference in weight comprises:
    sensing a first weight of the sample at the first pressure;
    sensing a second weight of the sample at the second pressure; and
    determining the difference between the first weight and the second weight and dividing by a volume constant to determine the difference in density.

5. Flow meter apparatus, connectable for fluid communication with a length of pipe and connectable to first and second probes, each probe being adapted to be positioned around the circumference of the pipe and displaced longitudinally along the pipe from the other, for measuring the rate of flow in an axial direction for a gaseous medium flowing through the pipe, the apparatus comprising:
    signal generating means for generating a first signal that is transmitted across the flow of gaseous medium from the first probe to the second probe, and a second signal that is transmitted across the flow of gaseous medium from the second probe to the first probe;
    signal receiving means for receiving the first and second signals through the second and first probes, respectively;
    digitizing means for receiving and digitizing portions of the first and second signals;
    first calculating means responsive to digitized portions of the first and second signals for determining a difference that is proportional to a travel time difference between a first travel time for the first signal and a second travel time for the second signal;

gas sample means connectable for fluid communication with the pipe, said gas sample means having a chamber of fixed volume for receiving a sample of the gaseous medium, and said gas sample means including means for sensing pressure, temperature and weight of the sample of the gaseous medium;

first valve means for establishing and interrupting fluid communication between the chamber and the pipe;

second valve means for opening and closing fluid communication through an outlet from the chamber;

first controlling means coupled to the gas sample means and coupled for controlling said first and second valve means in a sequence in which fluid communication is first established between the pipe and the chamber while holding the outlet closed, in which after a first time delay, pressure, temperature and weight of the sample are read, in which fluid communication is then interrupted between the pipe and the chamber and in which the outlet is opened, and in which after a second time delay, pressure, temperature and weight are read again;

second calculating means coupled to the first controlling means and responsive to differences in pressure and weight for a fixed volume of the gaseous medium for determining sonic velocity of the first and second signals as a function of the difference in pressure with respect to a difference in density;

third calculating means responsive to the flow rate determined by the first calculating means and responsive to the sonic velocity determined by the second calculating means for determining a flow rate for the gaseous medium; and second controlling means responsive to the determination of flow rate by the third calculating means for generating an output signal proportional thereto.

* * * * *